Dec. 21, 1965   E. T. NORD ETAL   3,224,590

PAINT FILTER

Original Filed March 14, 1960

INVENTORS.
ERIC T. NORD AND
SAMUEL R. ROSEN
BY
ATTORNEYS.

United States Patent Office 3,224,590
Patented Dec. 21, 1965

3,224,590
PAINT FILTER
Eric T. Nord, Oberlin, and Samuel R. Rosen, Lorain, Ohio, assignors to Nordson Corporation, Amherst, Ohio, a corporation of Ohio
Continuation of application Ser. No. 14,893, Mar. 14, 1960. This application Nov. 26, 1962, Ser. No. 241,463
4 Claims. (Cl. 210—438)

This application is a continuation of our co-pending application Serial No. 14,893, filed March 14, 1960, and now abandoned.

This invention relates to pain filters and particularly to filters suitable for use in filtering paint under high pressure or high temperature of both. For convenience, we shall use the word paint in its present comprehensive and conventional meaning in this art to comprehend painting, coating and finishing materials in general, including enamels, emulsions, slurries and suspensions, catalyzed resins, mastics and asphaltums, waxes and paraffins, oils and lubricants, lacquers, plastisols, adhesives and other specialty coatings.

Prior paint filters and, particularly, prior high pressure paint filters have been based on and designed to operate according to the old and well-known settling method of dealing with sediment and the like, filtered from a liquid. Such filters broadly comprise a settling chamber, an inlet and an outlet at or near the top of the chamber and a filtering element located ahead of the outlet and through which the paint to be filtered is forced to pass. Conventionally, the filtering element of such filters may take the form of a cylindrical screen, or a cylindrical pile of thinly spaced washers, whose axial dimension is several times greater than its diameter. These filters extended vertically down into and were surrounded by the settling chamber. The fluid to be filtered was introduced into the top of the settling chamber at a point radially outside of and surrounding the cylindrical filtering element and passed radially through the screen of the element from whence it is generally conducted axially upwardly and internally of the cylindrical filtering element to an outlet, the material to be separated from the filtered fluid being separated on the radially outer surface of the screen or pile. This arrangemnet permits and is designed to encourage the relatively undisturbed settling of sediment and particles removed from the paint into the lower portion of the settling chamber.

A point of difficulty in the operation of a conventional prior art settling type filter is at the upstream and/or lower side of the filter element or screen. During the operation of the filter, material removed from the fluid being filtered accumulates in the settling chamber. In addition, pigment settles out of the paint and tends to accumulate in the settling chamber when the flow of paint through the filter is reduced or stopped. The accumulated material in the settling chamber tends to form a semi-hardened mass of material which, if not periodically removed, will eventually build up and block a portion of the filtering area of the filter element extending into the settling chamber. A blowdown or drain-off valve at the bottom of the settling chamber may or may not be effective to remove the sediment if it is not too caked. Even when such a valve is provided, however, it is frequently necessary to disassemble the filter and mechanically remove the accumulation of separated material and caked pigment from the lower portion of the settling chamber and the filtering element.

The prior art filters are also subject to other operational disadvantages. For instance, when paint flow through the filter is reduced or stopped, pigment tends to settle out of suspension by gravity onto the downstream side of the filtering element where it tends to stick together and to the filter element and form a semi-hardened mass. Upon a subsequent increase in the rate of flow of paint through the filter, this mass of settled pigments may break loose and break up and be carried through the rest of the system into the orifices, areas or channels which the filter is supposed to be protecting. On the other hand, this mass always reduces the capacity of the filter and tends to end its usefulness.

A general object of our invention is to provide a "self-cleaning" filter especially adapted to filter hot paint under high pressure, and which, with-all, is small in relation to its capacity, light in weight and rugged in structure, adapted to withstand thermal expansion and contraction, as well as, and/or simultaneously with, great changes in pressure or under high pressure.

A specific object is to eliminate settling chambers in paint filters structurally and/or functionally and eliminate the problems inherent therewith and incident thereto. Another and more general object is to solve the problems that have heretofore plagued the prior art of hot paint filters including those mentioned and referred to above.

One of the objects of our invention, therefore, is to provide an effective paint filter which does not permit the formation of accumulations of separated material and/or paint pigment tending to reduce the efficiency of the filter. A particular object is to provide a paint filter which prevents the accumulation on the downstream side of the filtering element of pigment that may settle out of the paint during periods of reduced or no flow through the filter. A specific object of our invention is to provide a paint filter which acts to prevent the accumulation and formation into a semi-hardened mass of the material separated from the paint by the filter and pigment that may settle out of the paint on the upstream side of the filtering element. A further object is to provide a paint filter of simple construction having a minimum number of parts that are easily assembled, disassembled, cleaned, repaired, obtained and replaced. Yet another object is to provide a simple and effective seal between the necessarily separable outer parts of the filter.

Briefly, we accomplish these, and other objects that will appear as this description proceeds, by departing from the widely accepted settling method of dealing with the material separated by, at or in the filter. A preferred form of filter embodying our invention is described below in connection with the accompanying drawings in which.

Figure 1:
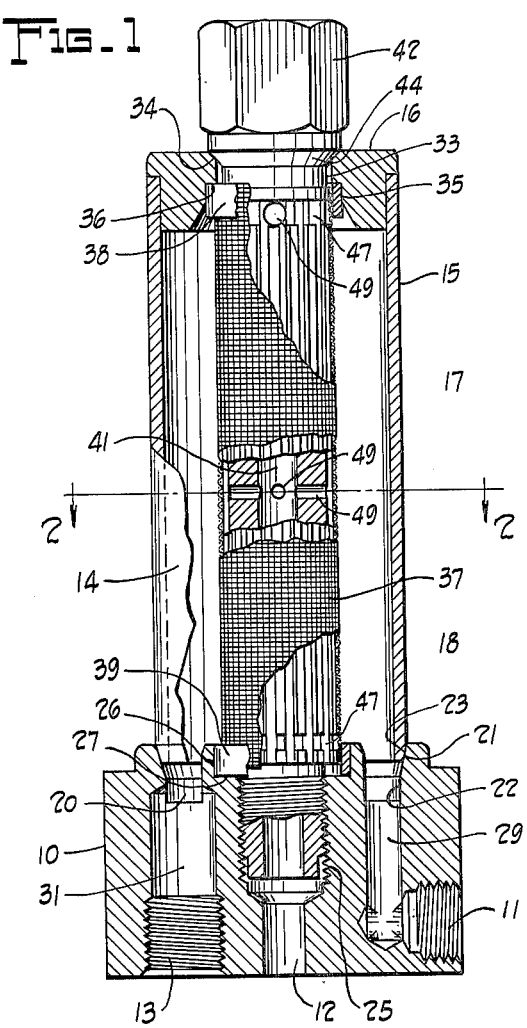
FIGURE 1 is a side elevation of our filter in assembled condition and showing the filter base and shell in section and the internally located filtering element and the combined tie bolt and outlet channel in partial section.

In its preferred form and as seen in FIGURE 1, our filter comprises a base 10 having an inlet 11 and outlets 12 and 13, a cylindrical shell 14 having a straight side wall 15 and a closed upper end wall 16 and having its lower open end fitted to the base 10. Our filter also comprises a cylindrical filtering element or screen 17 having both ends open and a combined tie bolt and outlet conduit 18 which acts to hold the various elements of the assembled filter together. The top face of base 10 is provided with an annular groove 20 adapted to receive the annular open end of shell 14. In order to obtain a satisfactory seal, the external annular surface of cylindrical shell 14 adjacent its open end is tapered inwardly toward the open end as at 21 and that portion of the radially outward wall 22 of annular groove 20 is tapered a complementary amount as at 23 so as to match and engage the taper on the end of cylindrical shell 14.

This structure acts to seal the joint between the shell 14 and base 10 under conditions of widely varying pressure and temperature in a manner described below.

Figure 2:
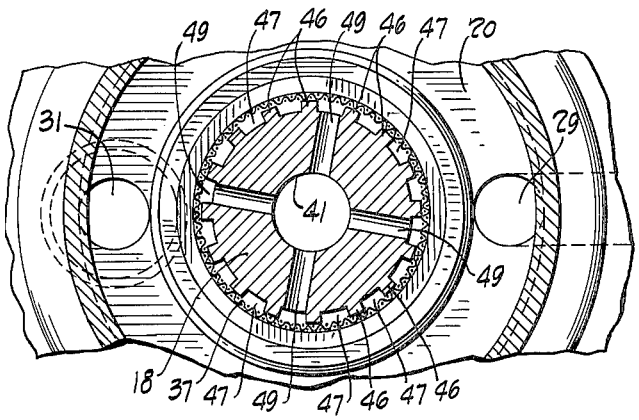
FIGURE 2 is an enlarged cross section through the filter taken along the line 2—2 as shown in FIGURE 1.

A central, vertical, partially tapped bore 12–25 is provided through base 10 concentric with annular groove 20 comprising the lower outlet portion 12 and the upper threaded portion 25. Above and beyond the tapped portion 25, the bore is counterbored and enlarged as at 26 with a radially extending internal shoulder 27 proximate the upper ends of the threads of the bore 25. A threaded inlet port 11 in base 10 communicates with the interior of cylindrical shell 14 by means of a vertical passage 29, see also FIG. 2, connecting inlet 11 with the bottom of annular groove 20. To accommodate blow-down and/or drain-off, we provide a separate vertical passage 31, see also FIG. 2, preferably larger than the passage 29 and also communicating with the interior of cylindrical shell 14 via the bottom of annular groove 20 and having a threaded outlet port 13. An appropriate plug or valve, not shown, may be screwed into the outlet 13 to close the same under normal or usual operation of the filter, and to permit drainage or blow-down whenever desired.

The upper-end wall 16 in cylindrical shell 14 is provided with a centrally located bore 33. The outer end of bore 33 is reamed and tapered as at 34 and the inner end is counterbored and enlarged as at 35 and has a radially extending shoulder 36, vis-a-vis the shoulder 27 of the base 10.

The filtering element 17 has an exterior cylindrical screen portion 37 with upper and lower annular end bearing rings 38 and 39 which have an internal diameter adapted to closely receive the ends of the screen; the rings 38 and 39 overlying the ends of the screen cylinder 37 and being attached thereto as by brazing to form axial and radial bearing surfaces on each end of the screen. The outside diameter of bearing ring 38 fits the counterbore 35 with a snug fit. The inside diameter of bearing ring 38 with screen cylinder 37 brazed therein substantially matches, and is preferably no smaller than the inside diameter of hole 33 when the axial end of bearing ring 38 abuts the shoulder 36. Bearing ring 39 is similarly received in the counterbore 26 of bore 25 in base 10. The length of screen cylinder 37 is such that the axial ends of the two bearing rings 38 and 39 are firmly abutted against shoulders 36 and 27, respectively, when the paint filter is assembled as shown in FIGURE 1.

Figure 3:
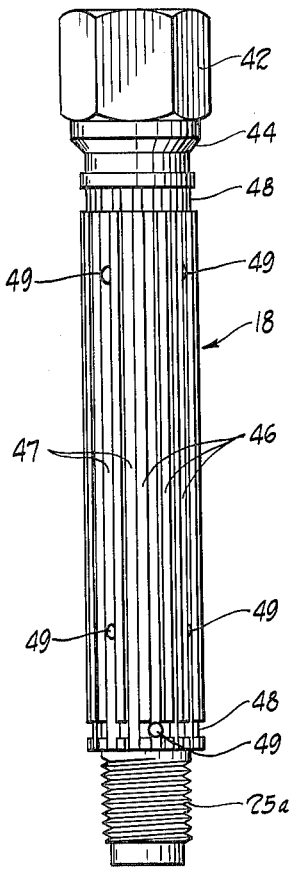
FIGURE 3 is a side elevation of the tie bolt removed from the filter.

Tie bolt 18, see FIG. 3, has an internal bore 41 extending from its lower externally threaded end 25a up to, but not through its hex head portion 42. The bolt 18 passes through the central bore 33 in the top closure 16 of shell 14 and engages tapped bore 25 in base 10 and acts in tension to tighten down the shell 14 into the annular taper 23. Below the head 42, tie bolt 18 is provided with a tapered annular surface 44 which matches and engages taper 34 on the outer end of bore 33 to effect a fluid-tight seal of bore 33 against loss of internal fluid pressure within shell 14 during operation of the paint filter. That portion of tie bolt 18 passing through cylinder screen 37 is externally fluted with circumferentially spaced axially extending ribs 46 freely slidable within and engaging the interior of the cylinder screen 37 and supporting the screen against deformation or collapse. External axial grooves 47 lie between ribs 46 on the outside of bolt 18 and on the downstream side of screen cylinder 37, and communicate with each other at their ends where ribs 46 are cut off and terminate in annular grooves 48. A number of radially directed holes 49 connect the grooves 47 and 48 with central bore 41 of the tie bolt. The ribs 46 back up and prevent deformation and collapse of cylinder screen 37 under endwise compression between the shoulders 27 and 36 and under adverse operating conditions. The grooved passages 47 and 48, together with holes 49 collect and direct the filtered material from the downstream side of screen 37 to central bore 41 of tie bolt 18 which is in communication with outlet 12 at the bottom of the filter.

A feature of our invention is the facility with which the filter screen 37 with its terminal rings 38 and 39 may be stripped from the fluted tie bolt 18 wherewith to separate these two constituent elements of our filter when the same are sought to be inspected, cleaned, replaced and/or repaired. When the parts are assembled in their operative relation as shown in FIG. 1, then if the tie bolt be unscrewed from the base while the shell 14 is held in approximately its normal fixed relation to the base as shown in FIGURE 1, the bolt will thereupon be screwed back, upwardly and outwardly of the screen as well as out of the end closure 16 of the shell 14. When the threads 25–25a have become disengaged, the bolt 18 may then be drawn upwardly as viewed in FIGURE 1 out of the shell and out of the filter screen, leaving the screen in approximately the position shown in FIG. 1 with, however, the tie bolt removed; the seating of the upper ring 38 in the counterbore 35 retaining the screen inside of the filter shell while the tie bolt is stripped from within the interior thereof. Thereafter, manual removal of the shell 14 from the base 10 will disconnect one end or the other of the screen either from the base or from the closure of the shell and leave the screen in a position for manual removal from whichever of the counterbores 26 or 35 with which the screen may have remained in engagement. Alternatively, the shell, bolt and filter screen may be unscrewed together from the base and the bolt may then be stripped upwardly from within the screen as mentioned above, or the screen may be stripped off the bolt while the bolt continues its engagement with the closure on the tapered surfaces 34–44. The facility with which the screen may be stripped from the bolt is a matter of significant convenience and also serves to preserve the screen from injury that might befall it under less propitious conditions.

In operation, the filter is assembled as shown in FIGURE 1 with inlet 11 connected to a paint or fluid supply under pressure, not shown, and outlet 12 connected to the system, hose, conduit or gun which is to be supplied with the filtered paint or fluid. Outlet 13 is normally closed by a plug, drain-off or blow-down valve. Unfiltered paint under pressure enters the filter through inlet 11 and flows upwardly into shell 14 through passage 29 and between side wall 15 of the shell 14 and the outside or upstream side of screen 37 of filtering element 17. Under the influence of system pressure, the fluid is forced radially through filter element 17 from the upstream to the downstream side of cylindrical screen 37. The material too large to pass through the screen is separated from the fluid on the upstream side of the screen 37 while the filtered fluid that has passed through the screen flows along passages 47 and 48 and radially through holes 49 into the central bore 41 of tie bolt 18. The filtered fluid flows downwardly in bore 41 and out of the lower end of tie bolt 18 through outlet 12. Substantially all the filtered paint is required to flow downwardly and out of the filter promptly and directly after being filtered through the screen 37 and given no place and little time to effect sedimentation or deentrainment of any part or constituent on the downstream side of the screen in the filter. On the upstream side of the screen, the incoming upwardly directed flow of paint tends to forever wash the screen and prevent adhesion thereto of waste and filtered-out material, and also agitates and disperses filtered-out substances and impurities from accumulating in the bottom of the filter chamber between the screen and the shell near the inlet 29. By the same token and effect, the waste and impurities are given substantially no rest or refuge in the filter chamber other than near the blow-down outlet 31 and in that outlet or in the conduit leading from the outlet to the blow-down valve. Another of the accomplishments of our invention is to free the filter screen and filter chamber from accumulated waste and place it where it can be easily and largely removed by simple outflow through the waste outlet.

During operation, our filter is expected to be subjected to high internal fluid pressures and high temperatures. For example, the preferred embodiment of our invention is often and successfully used in systems operating at from about 500 to 1000 pounds per square inch and with fluid temperatures exceeding 300° F. Under such conditions, the tie bolt 18 cooperates with the novel seal of our invention to prevent leakage between the shell 14 and the base 10. The tie bolt 18 is normally drawn up tightly so that the surfaces of the two tapers 34 and 44 at the top of shell 14 and the upper end of tie bolt 18, respectively, and the surfaces of tapers 22 and 23 of shell 14 and base 10, respectively, are in fluid-tight sealing engagement with each other. The high pressure acting internally of the filter against closure 16 tends to force the surface of female taper 34 at the top of cylindrical shell 14 into tighter sealing engagement with the surface of male taper 44 on tie bolt 18. The high internal pressure thus also places that portion of tie bolt 18 below taper 44 in tension tending to stretch the bolt and axially displace the surface of taper 21 on the bottom of shell 14 away from the surface of taper 23 on base 10. However, the fluid-tight seal between surfaces of tapers 21 and 23 is not impaired in spite of axial displacement due to elongation of tie bolt 18, because the internal pressure within the shell tends to increase the diameter thereof in at least the region of reduced wall thickness at and near the taper 21 whereby to hold the outer surface of taper 21 in sealing engagement with the surface of taper 23. Thus, the seal between the shell 14 and the base 10 is accomplished by making the joint therebetween on a long, gentle, axial taper and by making the wall thickness of the shell 14 thin enough, consistent with strength to resist bursting, to yield an increase in diameter of the shell great enough to maintain a fluid-tight seal beween the contacting surfaces while the shell 14 is displaced axially away from the base because of the elongation of tie bolt 18. In this connection, we prefer to use an axial taper of approximately 10°. That is to say: we keep the tapered joint 21–23 fluid-tight against high fluid pressure by balancing diametric expansion of the shell against stretch of the tie bolt. Additionally, the seal 21–23 accommodates differences in longitudinal expansion of the shell and tie bolt and changes in circumferential dimension between shell 14 and annular groove 20 due to temperature changes.

From the foregoing description of structure and operation of a preferred embodiment, it will be apparent that our invention overcomes the undesirable settlement of pigment or other paint constituents out of suspension into the downstream side of the filtering wall or screen by avoiding traps and resting places on the downstream side of the screen and by locating the outlet from the filter at the bottom of and in the axis of outflow from the filtering screen. There is no place in our filter for pigment or other parts of the filtrate to settle out and/or accumulate on the downstream side of the filtering screen except in the outlet passage from the filter whence it is carried off and along in the downstream channels where flow and agitation tend to entrain or reentrain it in or into the paint stream. Because the pigment and other deentrainable parts of the filtrate cannot settle out of the paint outside of the stream of flow from the filter, they cannot accumulate sufficiently to form any compact or semi-hardened mass as they do in settling type filters.

The problem of build-up of accumulated separated material and the like in the bottom of the settling chamber around the outside of the upstream side of the filtering element is effectively solved by our invention by the elimination of settling chambers as previously known; that is, one in which settling is permitted, undistributed and unagitated by the flow of fluid through the system. In our filter the incoming fluid enters the fluid chamber at the bottom and is directed upward along the outer surface of the filtering screen. The flow of fluid in this case tends to continuously agitate the separated waste and impure materials. This flow prevents the separated material from packing and forming any compact and semi-hardened mass removed from the path of waste removal through the blow-down valve or waste discharge orifice.

Any air that might otherwise tend to be trapped in the top of the filter chamber is entrained in the fluid stream and evacuated from the chamber and carried away through the filtrate outlet 12 of the filter. It appears that this desirable result is aided and/or affected by the projection of the incoming fluid upwardly and parallel with the filtering screen, particularly when high pressure is employed in the filter. We prefer to have the small intake opening 29 point into cylindrical shell 14 from base 10 in order to get a high velocity flow or jet into the filter chamber between the shell and the screen. We also prefer that the filter chamber be rather narrow and elongated in order to give vigorous turbulent motion to all the paint therein, including the top part of the shell where air might otherwise tend to be trapped.

Further, our invention provides a fluid-tight seal without the aid of O-rings or other sealing elements between the cylindrical shell and the base of the filter where there must be a detachable connection to permit assembly, cleaning and replacement of parts. The taper seal 21–23 also permits the desirable result of holding the working parts of the filter together and maintaining a fluid seal between them by the use of a single bolt even while the bolt is elongated by tension and/or thermal expansion.

Changes, modifications and improvements may be made to the above-described preferred form of our invention without departing from the precepts and principles of our invention and the essential teachings of this specification. Therefore, we do not wish our patent to be limited to the particular form of our invention herein specifically illustrated and described nor in any manner inconsistent with the progress by which our invention has promoted the art.

We claim:
1. A paint filter comprising
a ported base and
a hollow cylindrical pressure vessel with a vertical axis mounted above and upon said ported base,
    said base having a smooth, upwardly facing, female, conical metal surface with its axis coincident with the said axis of said vessel, and
    said vessel having its upper end closed and having an open substantially circular lower end, said lower end being diametrically expansible under fluid pressure and being yieldable with respect to its circular form,
    said lower end of said vessel having a smooth metal male surface cooperative with and entering and engaging said female surface and having exclusive metal-to-metal, sliding and sealing contact therewith,
    said base having a paint inlet port and a paint outlet port communicating with said vessel adjacent said lower end of the vessel,
filtering means disposed in said vessel across the path of paint flow through said vessel from said inlet port to said outlet port,
a tension member having an axis substantially coincident with said axes and acting between the upper end of said vessel and said base and holding said male surface of said lower open end of said vessel in fluid-tight, slidable, sealing engagement with said female surface of said base portion,
    the angle of pitch of said conical female surface of said base with respect to the axis thereof being no greater than the angle at which sealing contact would tend to be lost between said surfaces when said tension member is stretched axially and said male surface is moved axially upwardly and expanded radially outwardly by the pressure of fluid in said vessel, metal-to-metal sealing engagement being maintained between said male and female surface irrespective of relative movement therebetween due to changes in fluid pressure in said vessel.

2. The paint filter according to claim 1 in which said filtering means has an axis coincident with said axis and has a hollow cylindrical end portion, and said base and the said closed end of said vessel have means engaging and positioning said filtering means, said filter engaging means and said filtering means having an axially sliding fit at said hollow cylindrical end portion to maintain engagement therebetween irrespective of relative movement between said base and the said upper end of said vessel due to changes in fluid pressure in said vessel.

3. The paint filter of claim 1 in which the said male surface of the said lower end of said vessel is conical and substantially coextensive with the said female surface of said base when said vessel is stressed by fluid pressure therein.

4. A paint filter according to claim 1 in which said filtering means comprises an axially straight cylindrical pervious wall within and coaxial with said vessel having interior communication with said outlet port, and being laterally spaced away from the interior surface of said vessel, and forming an axially straight-walled, trap-free chamber therebetween, and in which said paint inlet port opens to said chamber radially outwardly beyond the radial extent of said filtering means, and projects paint directly at the upper end of said vessel for agitating paint in said chamber, and for washing said wall.

References Cited by the Examiner
UNITED STATES PATENTS

| | | | |
|---|---|---|---|
| 1,940,923 | 12/1933 | Stringer | 210—442 X |
| 2,389,431 | 11/1945 | Hallinan | 210—440 X |
| 2,554,748 | 5/1951 | Lewis et al. | 210—440 X |
| 2,747,744 | 5/1956 | Gretzinger | 210—442 |

REUBEN FRIEDMAN, *Primary Examiner.*

HARRY B. THORNTON, *Examiner.*